United States Patent

Monzaki

[11] Patent Number: 5,704,696
[45] Date of Patent: Jan. 6, 1998

[54] STABILITY CONTROL DEVICE OF VEHICLE DISTINCTIVE OF SPLIT-μ ROAD

[75] Inventor: Shirou Monzaki, Mishima, Japan

[73] Assignee: Toyota Jidosha Kabushiki Kaisha, Toyota, Japan

[21] Appl. No.: 726,325

[22] Filed: Oct. 3, 1996

[30] Foreign Application Priority Data

Oct. 18, 1995 [JP] Japan ................... 7-294753

[51] Int. Cl.$^6$ ................... B60T 8/24; B60T 8/58
[52] U.S. Cl. ................... 303/146; 303/149
[58] Field of Search ................... 303/9.62, 140, 303/146, 147, 148, 149, 150, 186, DIG. 6; 364/426.016

[56] References Cited

U.S. PATENT DOCUMENTS

| | | | |
|---|---|---|---|
| 5,188,434 | 2/1993 | Ruf et al. | 303/146 |
| 5,224,766 | 7/1993 | Oikawa et al. | 303/148 |
| 5,407,258 | 4/1995 | Giers et al. | 303/147 |
| 5,551,769 | 9/1996 | Luckevich | 303/148 X |

FOREIGN PATENT DOCUMENTS

A-6-24304  2/1994  Japan.

*Primary Examiner*—Josie Ballato
*Attorney, Agent, or Firm*—Oliff & Berridge, PLC

[57] ABSTRACT

A stability control device of a vehicle having a vehicle body, front and rear wheels, a device for estimating a liability of the vehicle body to drift out for producing a drift-out quantity which generally increases along with increase of the drift-out liability; a device for detecting lateral acceleration of the vehicle body; a brake for selectively applying a variable braking force to each of the wheels; and a controller for controlling the brake so as to variably apply a braking force to each of the wheels, wherein the controller controls the brake based upon the drift-out quantity such that a braking force applied to the rear wheels is increased with an increase of the drift-out quantity except for when the lateral acceleration is substantially minor.

5 Claims, 4 Drawing Sheets

STABILITY CONTROL DEVICE OF VEHICLE DISTINCTIVE OF SPLIT-μ ROAD

BACKGROUND OF THE INVENTION

1. Field of the Invention

The present invention relates generally to a behavior control of a vehicle such as an automobile for improving a driving stability thereof, and more particularly, to a stability control device distinctive of a surface condition of road which has different values of friction coefficient in the areas traveled by left and right wheels. Such a road surface condition is herein called split-μ.

2. Description of the Prior Art

It is well know that the automobiles or the like vehicle, are when unduly driven through a curved road or a corner, liable to "drift-out" as a phenomenon of instability that the front wheels slide outside of the turn under saturation of the tire grip force of the front wheels, because the side force applied to the vehicle body as a centrifugal force can increase with no limit along with increase of vehicle speed and steering angle, while the tire grip force for holding the vehicle body from the road surface is limited, particularly to be less on a slippery wet road.

Various endeavors have been made to suppress the automobiles and the like vehicles against spin anchor drift-out. An example is shown in Japanese Patent Laid-open Publication 6-24304, according to which controlled braking forces are applied to respective wheels by a feedback control system such that the actual yaw rate of the vehicle body conforms to a target yaw rate calculated based upon running conditions of the vehicle including steering condition.

The drift-out of a vehicle driven along a curved course can be effectively suppressed by braking the vehicle, particularly at the rear wheels, so that the vehicle is decelerated to decrease the centrifugal force applied thereto, and further, when the rear wheels are braked, the lateral vector component of the tire grip force of the rear wheel is decreased by an addition of a longitudinal vector component generated by the braking, as the total vector of the tire grip force available is limited and saturates in all directions, thereby allowing the rear wheel to slide outside of the turn, thus forwarding the running vehicle toward inside of the turn against the drift-out. However, when a vehicle equipped with such a drift-out suppress control is accelerated or braked while it is being driven along a straight split-μ road presenting different values of surface friction coefficient for left and right rear wheels, the vehicle would turn to either side of the road. For example, supposing that a road is showing a relatively low friction coefficient for the leftside wheels of a vehicle, while showing a relatively high friction coefficient for the rightside wheels of the vehicle, when the vehicle is braked substantially at the rear wheels, the vehicle would turn to the right, and the driver will almost unconsciously steer the vehicle toward the left to maintain the straight course of the vehicle. According to such a steering operation, if the drift-out control is adapted to operate based upon a difference between a steering angle detected by a steering angle sensor and a steering angle calculated from a yaw rate detected by a yaw rate sensor and a vehicle speed detected by a vehicle speed sensor, there is generated a difference of steering angle which actuates the drift-out control. However, since in this case the vehicle body is applied with no such centrifugal force which would be applied thereto if the vehicle is being driven along a curved course, the drift-out suppress control, i.e. automatic braking of the rear wheels, is useless or even undesirable for ensuring a stabilized behavior of the vehicle.

SUMMARY OF THE INVENTION

In view of the above-mentioned inconvenience concerned with the drift-out suppress control, it is a principal object of the present invention to provide a further improved stability control device of a vehicles in which the above-mentioned inconvenience is overcome.

In order to accomplish such an object, the present invention proposes a stability control device of a vehicle having a vehicle body, and front and rear wheels, comprising:

a means for estimating a liability of the vehicle body to drift out for producing a drift-out quantity which generally increases along with increase of the drift-out liability;

a means for detecting lateral acceleration of the vehicle body;

a brake means for selectively applying a variable braking force to each of said wheels; and a control means for controlling said brake means so as variably to apply a braking force to each of said wheels, wherein said control means controls said brake means based upon said drift-out quantity such that the rear wheels are braked generally at higher intensity according to increase of said drift-out quantity, with a modification that, when the lateral acceleration is substantially minor, the participation of said drift-out quantity in the rear wheel braking control is substantially canceled.

In the above-mentioned stability control device, the lateral acceleration may be judged to be substantially minor when the lateral acceleration is, in the absolute value thereof, smaller than a threshold value determined therefor.

Or, in the above-mentioned stability control device, the lateral acceleration may be judged to be substantially minor when ratio of the lateral acceleration to longitudinal acceleration of the vehicle body is, in the absolute value thereof, smaller than a threshold value determine therefor.

Or, in the above-mentioned stability control device, the lateral acceleration may be judged to be substantially minor when ratio of the lateral acceleration to said drift-out quantity is, in the absolute value thereof, smaller than a threshold value determine therefor.

The above-mentioned stability control device may comprise a means for detecting vehicle speed, a means for detecting yaw rate of the vehicle body, and a means for detecting steering angle, wherein said control means may calculate said drift-out quantity as an absolute value of a difference between a steering angle detected by said steering angle detection means and a steering angle calculated based upon a vehicle speed detected by said vehicle speed detection means and a yaw rate detected by said yaw rate detection means.

The operation of the above-mentioned stability control device and the functions and the merits available thereby will be clear from the following descriptions made with regard to an embodiment thereof with reference to the accompany drawing.

BRIEF DESCRIPTIONS OF THE DRAWING

In the accompanying drawing.

3

Figure 2:
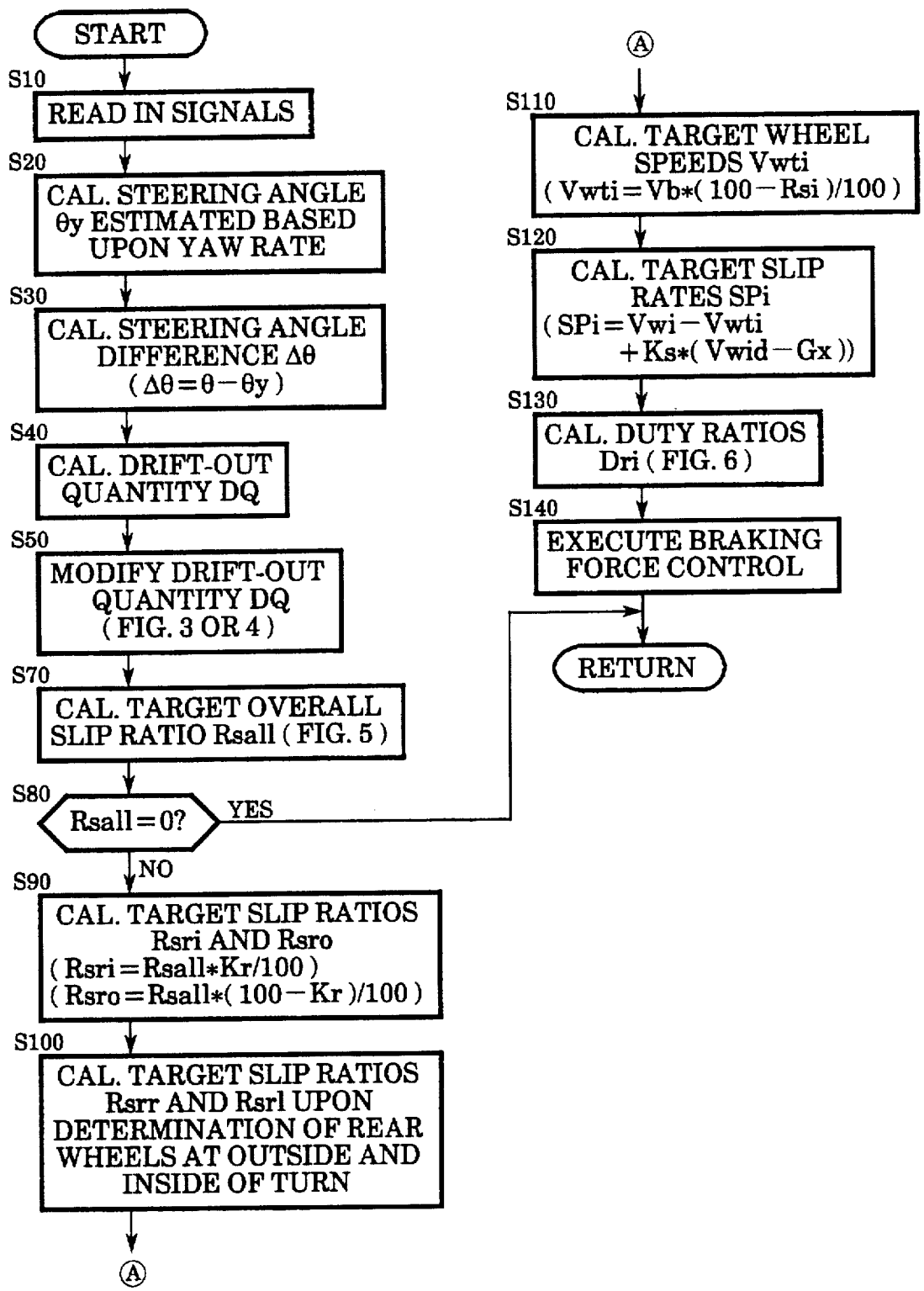
FIG. 2 is a flowchart showing an embodiment of the stability control routine conducted by the device of the present invention.
Figure 4:
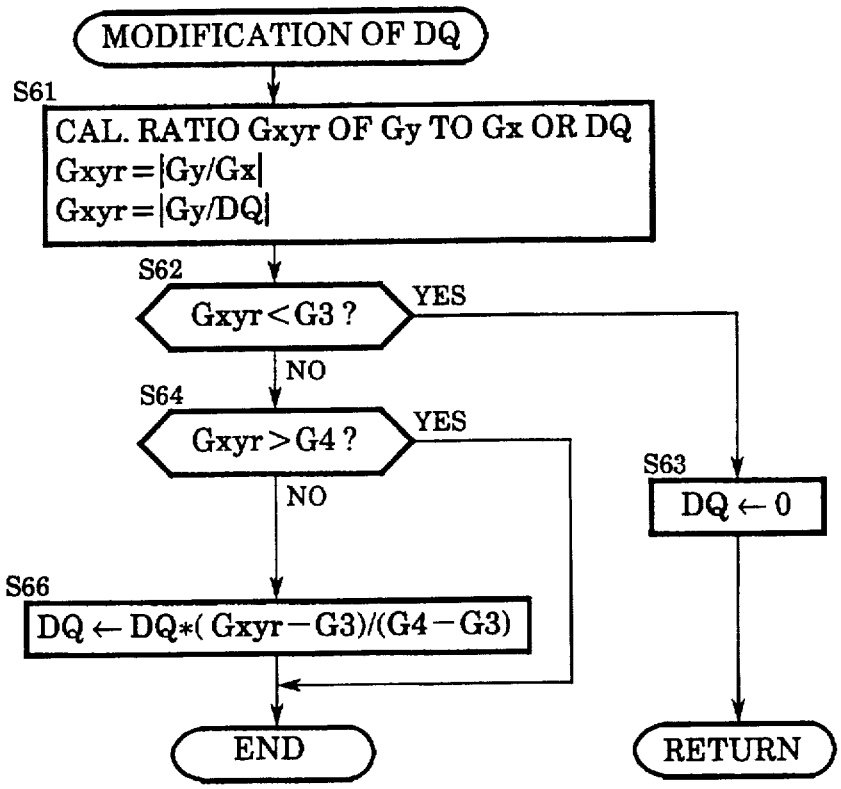
Figure 5:
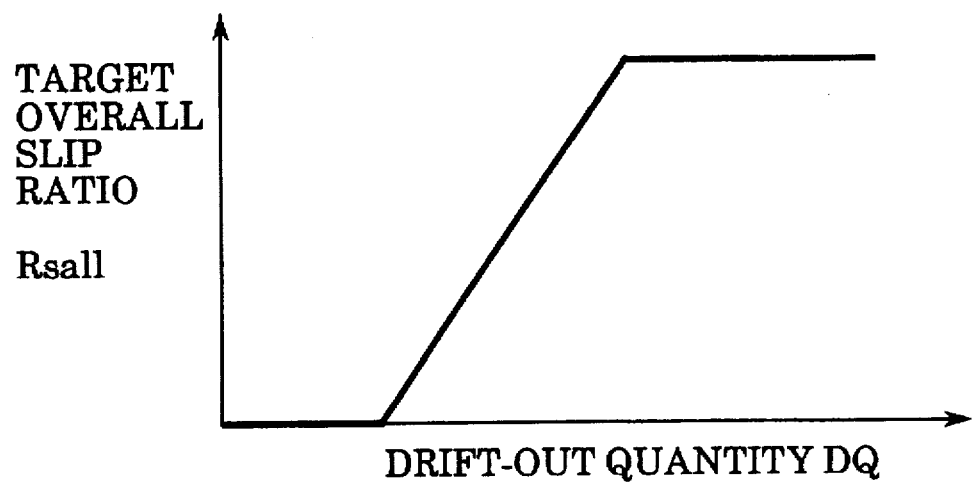
Figure 6:
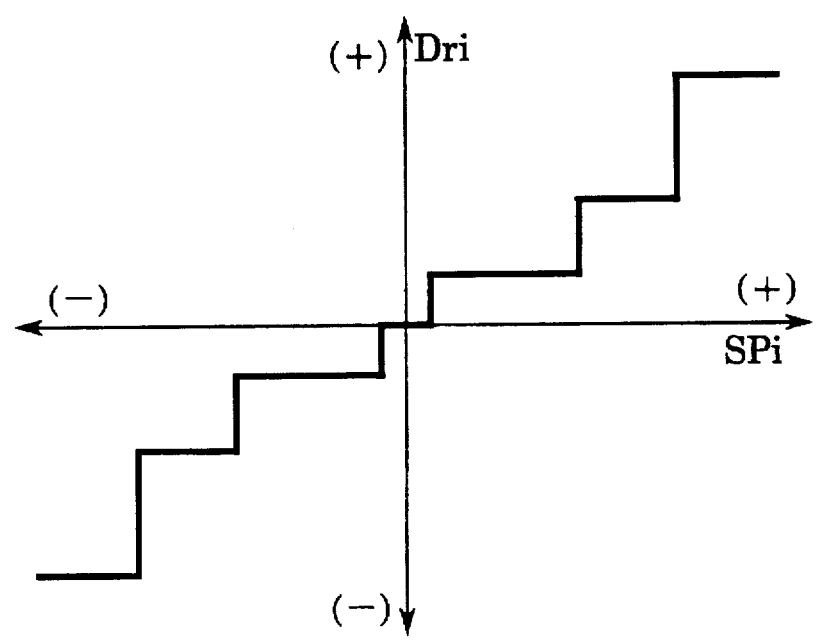

FIG. 4 is a flowchart showing the detail of the step of modifying the drift-out quantity for the control by the routine of FIG. 2;

FIG. 5 is a map showing the relationship between the drift-out quantity for control and the target overall slip ratio; and FIG. 6 is a map showing the relationship between the target slip rate of the rear wheel and the duty ratio for controlling the brake of the rear wheel.

DESCRIPTION OF THE EMBODIMENTS

In the following, the present invention will be described in more detail in the form of a preferred embodiment with reference to the accompanying drawings.

Figure 1:
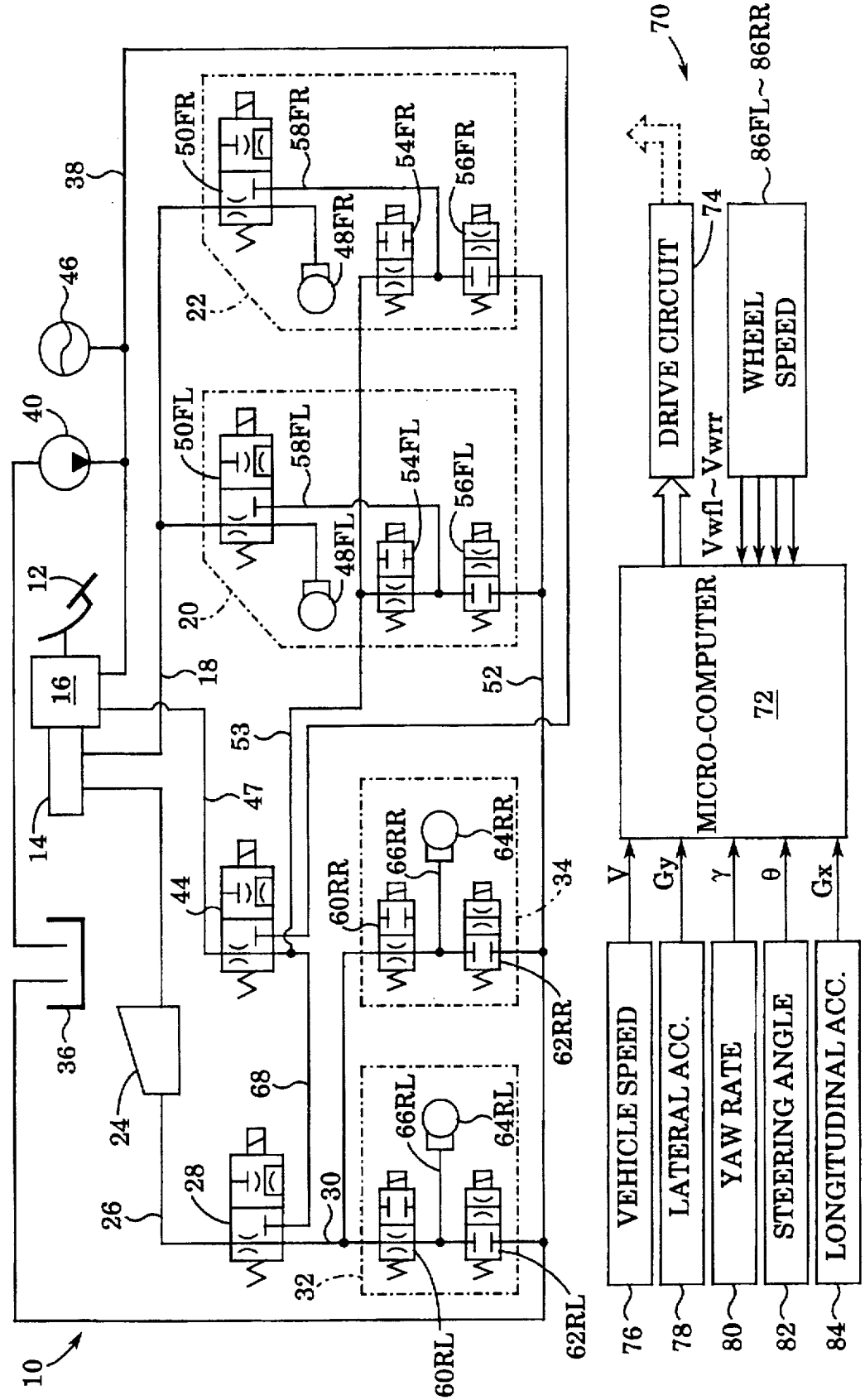
FIG. 1 is a diagrammatic illustration of hydraulic circuit means and electrical control means of an embodiment of the stability control device according to the present invention.

First, referring to FIG. 1 showing diagrammatically an embodiment of the behavior control device of the present invention with regard to the constructions of its hydraulic circuit means and its electric control means, the hydraulic circuit means generally designated by 10 comprises a conventional manual brake pressure source means including a brake pedal 12 to be stepped on by a driver, a master cylinder 14 adapted to generate a master cylinder pressure according to the stepping-on of the brake pedal 12, and a hydro-booster 16 which generates a booster pressure.

The hydraulic means 10 further comprises a powered brake pressure source means including a reservoir 36 and a brake fluid pump 40 which delivers a pressurized brake fluid to a passage 38 to which an accumulator 46 is connected, so that a stabilized accumulator pressure for the automatic brake control described hereinbelow is available in the passage 38. The accumulator pressure is also supplied to the hydro-booster 16 as a pressure source for generating a booster pressure which has substantially the same pressure performance as the master cylinder pressure depending upon the stepping-on performance of the brake pedal 12 but is capable to maintain such a pressure performance while the brake fluid is being consumed by a series connection of a normally open type on-off valve and a normally closed type on-off valve to obtain a desired brake pressure, as described hereinbelow.

A first passage 18 extends from a first port of the master cylinder 14 to a front left wheel brake pressure control means 20 and a front right wheel brake pressure control means 22. A second passage 26, including a proportioning valve 24, extends from a second port of the master cylinder 14 toward both of a rear left wheel brake pressure control means 32 and a rear right wheel brake pressure control means 34, via a 3-ports-2-positions changeover type electromagnetic control valve 28, an outlet port of which is connected, via a common passage 30, with the rear left and right wheel brake pressure control means 32 and 34.

The brake pressure control means 20 and 22 of the front left and front right wheels include wheel cylinders 48FL and 48FR for applying variable braking forces to the front left and front right wheels, 3-ports-2-positions changeover type electromagnetic control valves 50FL and 50FR, and series connections of normally open type electromagnetic on-off valves 54FL and 54FR and normally closed type electromagnetic on-off valves 56FL and 56FR, respectively, said series connections of the normally open type on-off valves and the normally closed type on-off valves being connected between a passage 53 adapted to be supplied with the accumulator pressure of the passage 38 or the booster pressure from the hydro-booster through a 3-ports-2-positions changeover type electronic control valve 44 the operation of which is described hereinbelow, and a return

4 passage 52 connected to the reservoir 36. A mid point of the series connection of the on-off valves 54FL and 56FL is connected to a port of the control valve 50FL by a connection passage 58FL, and a mid point of the series connection of the on-off valves 54FR and 56FR is connected to a port of the control valve 50FR by a connection passage 58FR.

The brake pressure control means 32 and 34 of the rear left and rear right wheels include wheel cylinders 64RL and 64RR for applying braking force to the rear left and rear right wheels, respectively, and series connections of normally open type electromagnetic on-off valves 60RL and 60RR and normally closed type electromagnetic on-off valves 62RL and 62RR, said series connections of normally open type on-off valves and the normally closed type on-off valves being connected between the passage 30 connected to the one outlet port of the control valve 28 and the return passage 52. A mid point of the series connection of the on-off vanes 60RL and 62RL is connected to a wheel cylinder 64RL for applying braking force to the rear left wheel by a connection passage 66RL, and a mid point of the series connection of the on-off valves 60RR and 62RR is connected to a wheel cylinder 64RR for applying braking force to the rear fight wheel by a connection passage 66RR.

The control valves 50FL and 50FR are respectively switched over between a first position for connecting the wheel cylinders 48FL and 48FR with the manual brake pressure passage 18, while disconnecting them from the connection passages 58FL and 58FR, respectively, as in the state shown in the figure, and a second position for disconnecting the wheel cylinders 48FL and 48FR from the passage 18, while connecting them with the connection passages 58FL and 58FR, respectively.

The control valve 28 is switched over between a first position for connecting the passage 30 for both of the series connection of the on-off valves 60RL and 62RL and the series connection of the on-off valves 60RR and 62RR with the manual brake pressure passage 26 as in the state shown in the figure, and a second position for disconnecting the passage 30 from the passage 26, while connecting it with a passage 68 connected to one outlet port of the changeover control valve 44 together with the passage 53, so as to be connected with either a delivery port of the hydro-booster 16 or the accumulator pressure passage 38, according to whether the control valve 44 is in a first position such as shown in the figure or a second position opposite thereto.

When the control valves 50FL, 50FR and 28 are in the first position as in the state shown in the figure, the wheel cylinders 48FL, 48FR, 64RL, 64RR are connected with the manual brake pressure passages 18 and 26 so as to be supplied with the pressure of the master cylinder 14, thereby enabling the driver to apply a braking force to each wheel according to the stepping-on of the brake pedal 12. When the control valve 28 is changed over to the second position, with the control valve 44 being kept at the shown first position, the rear wheel cylinders 64RL and 64RR are supplied with the booster pressure according to the stepping-on of the brake pedal from the hydro-booster 16. When the control valves 50FL, 50FR, 28 and 44 are changed over to the second position, the wheel cylinders 48FL, 48FR, 64RL, 64RR are supplied with the powered accumulator brake pressure of the passage 38 under the control of the normally open on-off valves 54FL, 54FR, 60RL, 60RR and the normally closed type on-off valves 56FL, 56FR, 62RL, 62RR according to the ratio of the open state of the corresponding normally open type on-off valve and the closed state of the corresponding normally closed type on-off valve, i.e. the so-called duty ratio, apart from the stepping-on of the brake pedal 12.

The changeover control valves 50FL, 50FR, 28, 44, normally open type on-off valves 54FL, 54FR, 60RL, 60RR, normally closed type on-off valves 56FL, 56FR, 62RL, 62RR and the pump 40 are all controlled by an electric control means 70 as described in detail hereinbelow. The electric control means 70 consists of a micro-computer 72 and a driving circuit means 74. Although not shown in detail in FIG. 1, the micro-computer 72 may have a general construction including a central processing unit, a read only memory, a random access memory, input and output port means and a common bus interconnecting these functional elements.

The input port means of the micro-computer 72 is supplied with a signal showing vehicle speed V from a vehicle speed sensor 76, a signal showing lateral acceleration Gy of the vehicle body from a lateral acceleration sensor 78 mounted substantially at a mass center of the vehicle body, a signal showing yaw rate γ of the vehicle body from a yaw rate sensor 80, a signal showing steering angle θ from a steering angle sensor 82, a signal showing longitudinal acceleration Gx of the vehicle body from a longitudinal acceleration sensor 84 mounted substantially at the mass center of the vehicle body, and signals showing wheel speed (wheel circumferential speed) Vwfl, Vwfr, Vwrl, Vwrr of front left and right wheels and rear left and right wheels not shown in the figure from wheel speed sensors 86FL–86RR, respectively. The lateral acceleration sensor 78, yaw rate sensor 80 and steering angle sensor 82 detect the lateral acceleration, yaw rate and steering angle, respectively, as being positive when the vehicle makes a left turn, and the longitudinal acceleration sensor 84 detects longitudinal acceleration as being positive when the vehicle is accelerated in the forward direction. In general, in the following analyses, the parameters which are distinctive of the direction of turn of the vehicles are each assumed to be positive when the turn is counter-clockwise and negative when the turn is clockwise, as viewed from the top of the vehicle.

Figure 3:
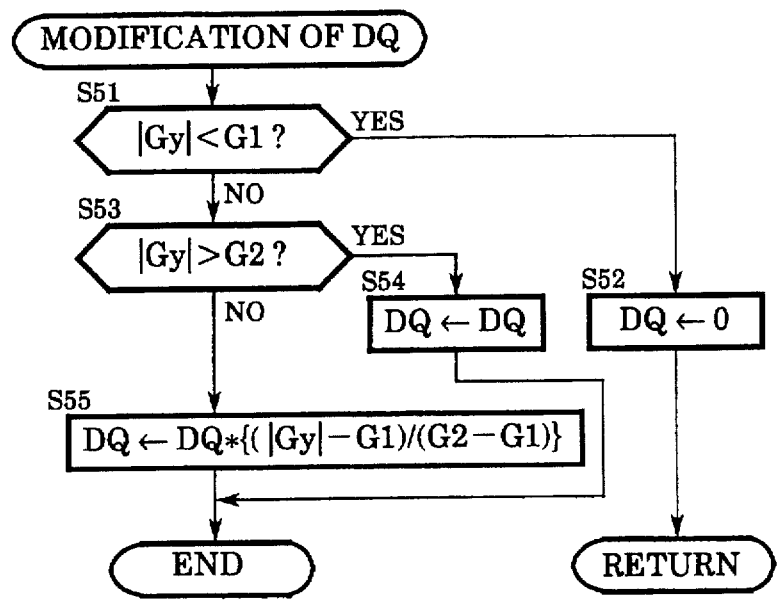
FIG. 3 is a flowchart showing the detail of the step of modifying the drift-out quantity for the control by the routine of FIG. 2.

The read only memory of the micro-computer 72 stores such flowcharts as shown in FIGS. 2, 3 and 4 and such maps as shown in FIGS. 5 and 6. The central processing unit conducts calculations based upon the parameters detected by the above-mentioned various sensors according to those flowcharts and maps as described hereinbelow, so as to obtain the spin quantity and the drift-out quantity for judging and estimating spinning state and drifting out state of the vehicle, respectively, and controls the turn behavior of the vehicle based upon the estimated quantities, particularly to suppress the vehicle against spinning and drifting out, by selectively applying a variable braking force to each of the wheels.

In the following, the stability control device of the present invention will be described in the form of an embodiment of its control operation with reference to FIGS. 2–6. The control according to the flowchart of FIG. 2 is started by a closure of an ignition switch not shown in the figure and carried out repetitively at a predetermined time interval such as tens of microseconds.

In step 10, the signals including vehicle speed V from the vehicle speed sensor 76 and others are read in. In step 20, by taking the gear ratio of the steering system as N and the wheel base as L, a steering angle is estimated based upon the yaw rate γ as follows:

$$y=(\gamma/V)*N*L*3.6 \qquad (1)$$

In step 30, difference Δθ between the actual steering angle detected by the steering angle sensor 82 and the steering angle estimated based upon the yaw rate is calculated as follows:

$$\Delta\theta=\theta-\theta y \qquad (2)$$

In step 40, a parameter herein called as a drift-out quantity DQ is calculated based upon the turning direction of the vehicle judged from the sign of the yaw rate γ such that the drift-out quantity DQ is equal to Δθ when the vehicle is making a left turn, whereas when the vehicle is making a right turn, the drift-out quantity DQ is equal to −Δθ. There is no negative value of the drift-out quantity DQ.

In step 50, the drift-out Quantity DQ is modified according to a routine of FIG. 3 or 4.

According to the routine of FIG. 3, in step 51 it is judged if the absolute value of the lateral acceleration Gy detected by the lateral acceleration sensor 78 is smaller than a relatively small threshold value G1 which will confirm that the vehicle is not being driven along a substantially curved course, or in other words, the vehicle, if being driven, is being driven along a substantially straight course. If the answer is yes, the control proceeds to step 52, where the drift-out quantity DQ is made zero, and the control returns to step 10. If the answer of step 51 is no, the control proceeds to step 53, where it is judged if the absolute value of Gy is greater than a relatively large threshold value G2. If the answer is yes, the control proceeds to step 54, where the value of DQ is maintained as calculated in step 40. If the answer of step 53 is no, the control proceeds to step 55, where the value of DQ is moderated to be substantially proportional to the value of Gy as follows:

$$DQ=DQ*\{(|Gy|-G1)/(G2-G1)\} \qquad (3)$$

If the lateral acceleration is judged as being substantially minor such that the absolute value of lateral acceleration Gy is less than the small threshold value G1, while any substantial value of DQ was calculated in step 40, it is presumed that such a substantial value of DQ is due to the vehicle being accelerated or braked on a straight split-μ road, with the driver endeavoring to steer the vehicle against shifting out of a straight course. Therefore, as will be appreciated from the above process of FIG. 3, in such a state no drift-out control is executed. Steps 53–55 are provided to stabilize the drift-out control in a gray zone between the state that the vehicle is being driven along a straight split-μ road and a state that the vehicle is being driven along a definitely curved course.

According to the routine of FIG. 4, the state that the vehicle is being accelerated or braked along a straight split-μ road with the driver steering the vehicle against shifting out of a straight course is judged more sophisticatedly by comparing the value of lateral acceleration Gy with longitudinal acceleration Gx or the calculated value of the drift-out quantity DQ. So in step 61, a parameter Gxyr is calculated as a ratio of Gy to Gx or Gy to DQ. (In each case, a measure is made not to make a calculation of dividing by zero, such as to set up a minimum non-zero value for the change of denominator.) In step 62, it is judged if Gxyr is smaller than an appropriately determined relatively small threshold value G3. By dividing Gy by Gx, the selection for canceling the false DQ due to a split-μ can be made with a lower threshold value of Gy. In other words, the contrast between the state that the vehicle was braked or accelerated along a straight split-μ road with the driver steering the vehicle against shifting out of a straight course and a state that the vehicle is actually turning along a curved course is more clearly exhibited. A similar effect is available by dividing Gy by DQ. If the answer of step 62 is yes, the control proceeds to step 63, where the value of DQ is made zero, and the control returns to step 10. On the other hand, if the answer of step 62 is no, the control proceeds to step 64, where it is judged if Gxyr is grater than a relatively large threshold value G4. If the answer is yes, this routine is ended without changing the value of DQ to proceed to step 70, whereas if the answer of step 64 is no, then the control proceeds to step 66, and the value of DQ is moderated to be substantially proportional to the value of Gxyr for a gray zone where the value of Gxyr is between G3 and G4, as follows:

$$DQ=DQ*(Gxyr-G3)/(G4-G3) \qquad (4)$$

Returning to the flowchart of FIG. 2, in step 70 a target overall slip ratio Rsall is determined based upon the drift-out quantity DQ processed through step 50, by referring to a map such as shown in FIG. 5. Then in step 80, it is judged if the target overall slip ratio Rsall is zero or not. If the answer is yes, the control returns to step 10, because in such a condition no drift-out control is desired.

When the answer of step 80 is no, the control proceeds to step 90, where the target overall slip ratio Rsall is distributed between target slip ratios Rsri and Rsro of the rear wheels at the inside and the outside of the turn according to an appropriate distribution factor Kr as follows:

$$Rsri=Rsall*Kr/100$$

$$Rsro=Rsall*(100-Kr)/100 \qquad (5)$$

In step 100, according to the direction of the turn of the vehicle judged from the sign of the yaw rate γ, the target slip ratios Rsrl and Rsrr for the rear left and rear right wheels are determined according to the following formulae 6 when the vehicle is making a left turn, or according to the following formulae 7 when the vehicle is making a right turn:

$$Rsrl=Rsri$$

$$Rsrr=Rsro \qquad (6)$$

$$Rsrl=Rsro$$

$$Rsrr=Rsri \qquad (7)$$

In step 110, by taking Vb as a reference wheel speed (for example, the wheel speed of the front wheel at the inside of the turn) the target wheel speed Vwti (i=rl, rr) are calculated according to the following formula 8:

$$Vwti=Vb*(100-Rsi)/100 \qquad (8)$$

In step 120, by taking Vwid as wheel acceleration (differentiation of Vwi) of the rear wheels and Ks as an appropriate positive factor, target slip ratios SPi (i=rl, rr) are calculated according to the following formula 9:

$$SPi=Vwi-Vwti+Ks*(Wwid-Gx) \qquad (9)$$

In step 130, referring to a map such as shown in FIG. 6, duty ratios for changing over the normally open type on-off valves 60RL and 60RR and the normally closed on-off valves 62RL and 62RR are determined based upon the values of the target slip ratios SPi. Then in step 140, the control valves 28 and 44 are changed over to the second position thereof, and the braking pressures supplied to the rear wheel cylinders 64RL and 64RR are controlled to be increased or decreased by an increment or decrement corresponding to the duty ratios Dri obtained above.

Although the present invention has been described in detail in the above with respect to a particular embodiment thereof, it will be apparent for those skilled in the art that various modifications are possible with respect to the shown embodiment without departing from the spirit of the present invention.

I claim:

1. A stability control device of a vehicle having a vehicle body, and front and rear wheels, comprising:
   a means for estimating a liability of the vehicle body to drift out for producing a drift-out quantity which generally increases along with increase of the drift-out liability;
   a means for detecting lateral acceleration of the vehicle body;
   a brake means for selectively applying a variable braking force to each of said wheels; and
   a control means for controlling said brake means so as variably to apply a braking force to each of said wheels, wherein said control means controls said brake means in accordance with said drift-out quantity such that a braking force applied to the rear wheels is increased with an increase of said drift-out quantity except for when the lateral acceleration is substantially minor.

2. A stability control device according to claim 1, wherein the lateral acceleration is judged to be substantially minor when the lateral acceleration is, in the absolute value thereof, smaller than a threshold value determined therefor.

3. A stability control device according to claim 1, further comprising a means for detecting longitudinal acceleration of the vehicle, wherein the lateral acceleration is judged to be substantially minor when ratio of the lateral acceleration to the longitudinal acceleration is, in the absolute value thereof, smaller than a threshold value determined therefor.

4. A stability control device according to claim 1, wherein the lateral acceleration is judged to be substantially minor when ratio of the lateral acceleration to said drift-out quantity, in the absolute value thereof, smaller than a threshold value determined therefor.

5. A stability control device according to claim 1, further comprising a means for detecting vehicle speed, a means for detecting yaw rate of the vehicle body, and a means for detecting steering angle, wherein said control means calculates said drift-out quantity as an absolute value of a difference between a steering angle detected by said steering angle detection means and a steering angle calculated based upon a vehicle speed detected by said vehicle speed detection means and a yaw rate detected by said yaw rate detection means.

\* \* \* \* \*